United States Patent [19]

Decker

[11] 4,221,665
[45] Sep. 9, 1980

[54] RAISIN HARVESTING APPARATUS

[76] Inventor: Edward Decker, 15200 W. Peach Ave., Livingston, Calif. 95334

[21] Appl. No.: 955,776

[22] Filed: Oct. 30, 1978

[51] Int. Cl.$^2$ .............................................. B07B 9/00
[52] U.S. Cl. .................................. 209/247; 209/421; 414/334; 414/403; 414/406; 198/522
[58] Field of Search ................... 209/247, 2, 420, 421; 198/308, 312, 318, 522, 520, 519; 414/403, 411, 334, 406

[56] References Cited

U.S. PATENT DOCUMENTS

| | | | |
|---|---|---|---|
| 1,781,857 | 11/1930 | Pape | 209/247 X |
| 3,412,840 | 11/1968 | Laikam | 198/308 |
| 3,587,814 | 6/1971 | Garabedian et al. | 198/318 X |
| 3,786,870 | 1/1974 | List | 209/247 X |

Primary Examiner—Ralph J. Hill
Attorney, Agent, or Firm—Claude A. S. Hamrick

[57] ABSTRACT

An improved raisin harvester including a front fork for sliding under a raisin laden tray, a draper web situated above the fork for engaging the trays and sliding them along the fork to a conveyor mechanism having a tray receiving end located at the upper end of the fork, running shoes extending downward from the conveyor mechanism, a wheeled chassis having a frame to which an assembly including all of the foregoing is pivotally attached, a shaker mechanism attached to the frame so as to be situated under the discharge end of the conveyor mechanism, a hydraulic jack for adjusting the tilt of the fork, conveyor and draper web assembly, a hydraulic power system for driving the conveyor, draper web, shaker tray and hydraulic jack, a tow bar for attaching the harvester to a tractor or other motive implement which pulls the harvester, and a trailer hitch to which a carriage for raisin receiving receptacles may be attached.

12 Claims, 4 Drawing Figures

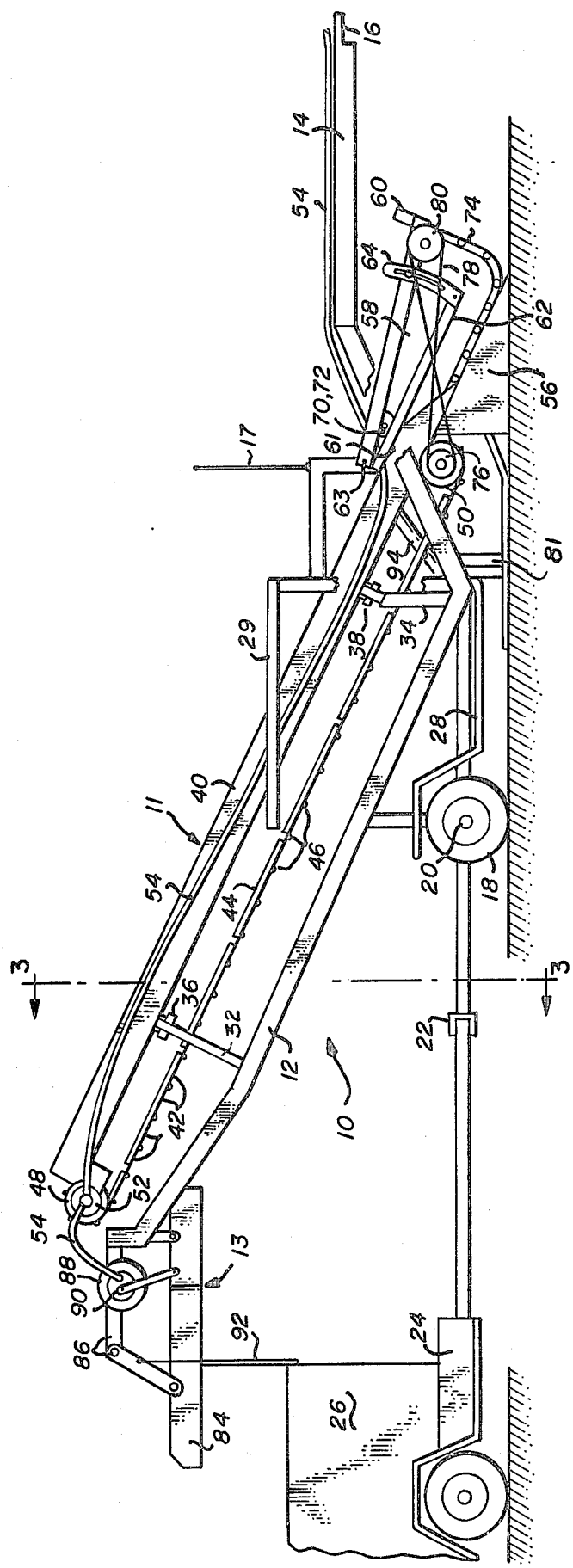

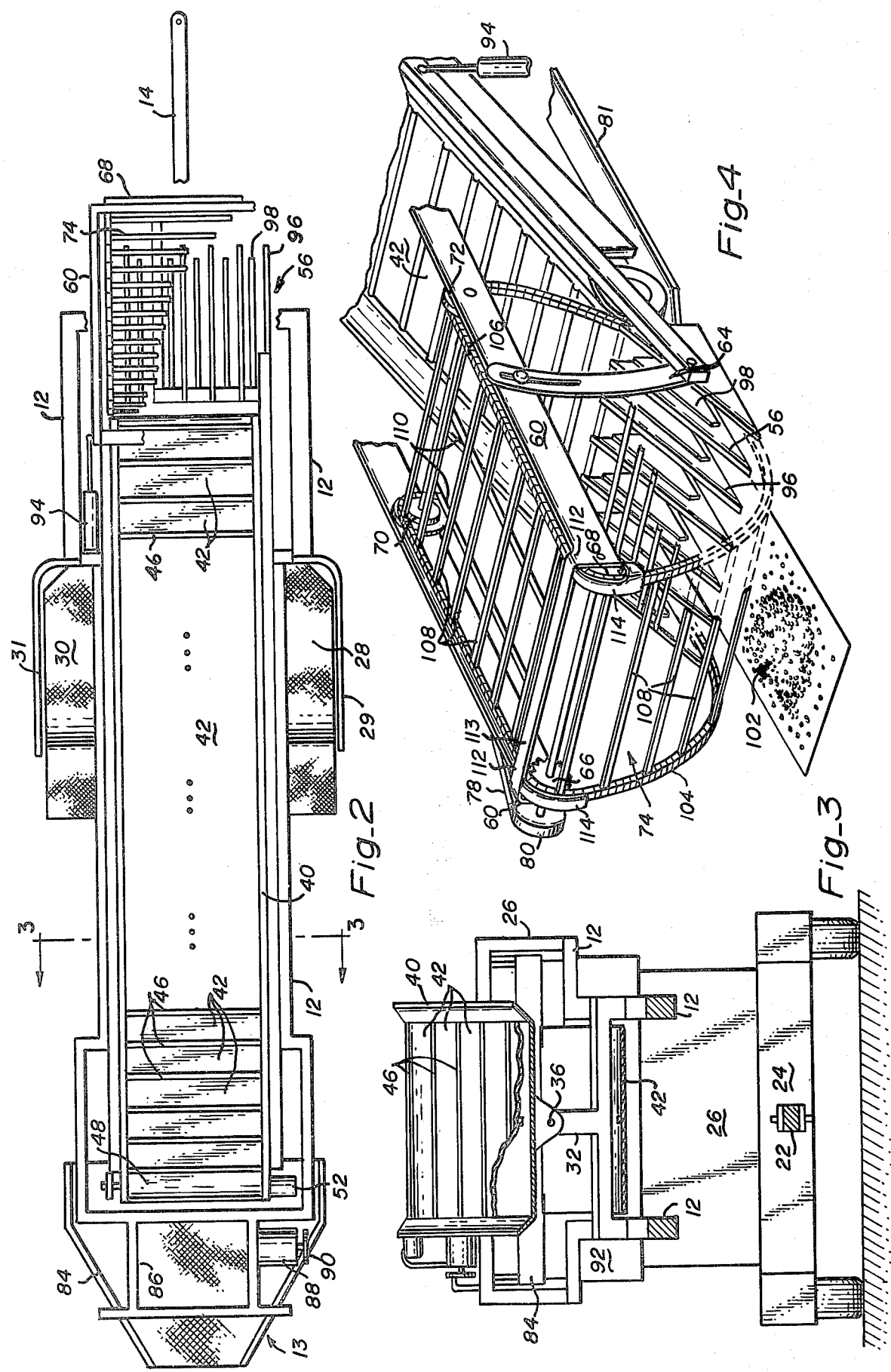

RAISIN HARVESTING APPARATUS

BACKGROUND OF THE INVENTION

1. Field of the Invention

This invention relates generally to material handling apparatus and more specifically to harvesting apparatus used to pick up dried raisins placed upon flat paper sheets or trays disposed on the ground between rows of grapevines.

2. Description of the Prior Art

Raisin grapevines are arrayed in east to west rows with the rows being separated by a distance slightly greater than the wheel base of an ordinary tractor. These rows are typically level at the points adjacent vines themselves, however, there is a raised area known as a terrace between the rows. In the northern hemisphere the terraces are sloped such that the north sides are higher than the south sides. In this manner the maximum benefit of direct solar rays upon the terrace surface is obtained. This sloping terrace surface and the heat retentive properties of the grapevines typically cause the temperature between the rows on the terrace to be relatively higher than the temperature on a flat surface outside of the row.

Raisin grapes are ordinarily harvested in the following manner. Initially, the grapes are picked from the vines, removed from the stems and placed upon flat rectangular paper sheets, known as trays, which are placed on the terraces between the rows. The grapes are then allowed to dry on the trays in the sun until they have reached the proper stage of dehydration and are ready to be eaten. At this point laborers manually go through the rows and either fold the trays into rectangular packets or roll the trays into packets that resemble a cigarette in shape. Following this step the packets containing the raisins are typically picked up by mechanical means. At some point during the pick-up phase, the trays are removed and the raisins are deposited in boxes or other receptacles. From this point they are delivered to commercial packing houses.

Although this harvesting technique is utilized almost universally, and particularly on large ranches which use mechanical harvesters, there are several problems which typically arise. These problems include excessive labor expenditures, mechanical alignment difficulties on the harvesters and contamination of the harvested raisins with sand, dust and other particulate matter.

The step of manually taking the raisin laden trays and folding or rolling them in packets is highly labor intensive. In a large vineyard this step may consume a significant number of man hours. Furthermore, after the packets are picked up by mechanical harvesters they must be unrolled or unfolded such that the raisins may be removed therefrom. This step also requires significant labor expenditures.

A second difficulty is caused by the terracing between the rows of grapevines. Mechanical harvesters are typically drawn by tractors which have their wheels in the level areas adjacent to the grapevines themselves. However, the raisin laden trays are laid on the terrace surface which slopes from north to south. Consequently, in order to properly pick up the trays, the harvester pick-up mechanism must be angled off the vertical so as to match the slope of the terrace. This tilt must also be adjustable or it would be necessary to travel down all rows in the same direction. A rigidly mounted pick-up mechanism would necessitate extensive dead travel time back to the beginning of the next row, since the rows are frequently very lengthy, as well as requiring undue uniformity in the terrace slope angles.

Another difficulty associated with the use of mechanical harvesters lies in the necessity of having the raisins in closed containers at the time that they are picked up from the ground by the harvester. Some prior art mechanical harvesters, such as those disclosed in the U.S. patents issued to Garbedian, U.S. Pat. No. 3,587,814, and Hanson, U.S. Pat. No. 3,795,335, are designed so as to pick-up raisins contained in closed packets of sufficient thickness such that the grasping apparatus of these harvesters can propel the packets onto the conveyor. Furthermore, at the point that prior art harvesters pick-up the packets from the terrace, significant loss of raisins can be caused by the turbulent motion of the harvesters if the packets are insufficiently closed.

A further difficulty encountered in the harvesting of raisins is the contamination of the raisins by sand, dust and other small matter which is blown or otherwise deposited on the trays either during the drying period or the harvesting operation. Since the grapevines are deprived of water for a significant period of time prior to picking and harvesting the ground in the vineyards become very dry and dusty. During the period in which the raisin grapes are drying on the trays, sand and dust are deposited on the trays by the wind. This particulate matter is included in the packets when they are folded or rolled and is consequently delivered along with the raisins to the receptacles by mechanical harvesters of the prior art types.

SUMMARY OF THE PRESENT INVENTION

It is therefore an object of the present invention to provide a means for picking-up raisins from the ground when such raisins are placed only on open trays and are not enclosed in packets.

It is also an object of the present invention to provide a raisin harvester with an improved adaptability to the slope of the terraces.

It is a further object of this invention to provide a raisin harvester which removes a great deal of the particulate matter such as sand from the raisins before delivering them to the receptacles.

Briefly, a preferred embodiment of the present invention includes: a front fork for sliding under a raisin laden tray; a draper web situated above the fork for engaging the trays and sliding them along the fork to a conveyor mechanism having a tray receiving end located at the upper end of the fork; running shoes extending downward from the conveyor mechanism; a wheeled chassis having a frame to which an assembly including all of the foregoing is pivotally attached; a shaker mechanism attached to the frame so as to be situated under the discharge end of the conveyor mechanism; a hydraulic jack for adjusting the tilt of the fork, conveyor and draper web assembly; a hydraulic power system for driving the conveyor, draper web, shaker tray and hydraulic jack; a tow bar for attaching the harvester to a tractor or other motive implement which pulls the harvester; and a trailer hitch to which a carriage for raisin receiving receptacles may be attached.

An advantage of the present invention is that the draper web interacts with the front fork in a manner such that open trays and the contents of the trays are propelled up the fork to the conveyor means with a minimum of spillage.

Another advantage of the present invention is that the draper web and front fork arrangement provide for efficient picking-up of open trays as well as packets.

A further advantage of the present invention is that the hinge type pivotal connection between the material handling portions of the harvester and the support frame when combined with the jack mechanism provides an improved means of adapting the tilt of the material handling portions of the harvester to match the tilt of the terrace found between the rows of raisin grapevines.

Still another advantage of the present invention is that the shaker mechanism removes a significant amount of the particulate matter, such as sand, from the raisins before delivering the raisins to the receptacles.

These and other objects and advantages of the present invention will no doubt become apparent after reading the following detailed description of the preferred embodiment which is illustrated in the several figures of the drawing.

IN THE DRAWING

FIG. 1 is a right side elevational view of a preferred embodiment of an improved raisin harvester. A portion of the support frame is cut away to show the draper web and its interrelationship with the conveyor and the front fork;

FIG. 2 is a top view of the preferred embodiment with a portion of the support frame and draper web cut away to show the front fork;

FIG. 3 is a cross section taken along line 3—3 of FIGS. 1 and 2, of the preferred embodiment illustrating one of the hinge type pivotal connections between the material handling portion of the raisin harvester and the support frame; and FIG. 4 is a perspective view of the lower front section of the preferred embodiment illustrating the interrelationship between the draper web, the front fork and the conveyor.

DETAILED DESCRIPTION OF THE PREFERRED EMBODIMENT

Referring now to FIG. 1 of the drawing, a right side elevational view of a preferred embodiment of the present invention is shown at 10. The harvester, as illustrated, is an apparatus designed to pick-up raisins and the open paper trays upon which they are disposed and to deliver the raisins to receptacles via a conveyor mechanism 11 and a shaker mechanism 13.

As illustrated, harvester 10 includes a wheeled chassis having a support frame 12 upon which the material handling elements of the harvester are mounted. Support frame 12 is formed such that the front portion includes a tow bar 14, the distal end of which is provided with a hitch 16 by which the tow bar can be attached to a tractor or other implement used to pull the harvester. A segment of the frame 12 extends across and above the front portion of the harvester. This segment of frame 12 is provided with holes in which spikes 17 are placed. As will be further discussed below, the spikes 17 provide a convenient means for storing trays as they are removed from the conveyor. Further discussed below, the spikes 17 provide a convenient means for storing trays as they are removed from the conveyor.

A further portion of the chassis frame 12 includes a pair of wheels 18 mounted upon an axle 20. Wheels 18 are spaced apart by a predetermined distance such that when pulled through the rows of a raisin grape vineyard, the wheels will travel upon the level ditch areas next to the vines themselves and not upon the terraced section of the row.

At a point to the rear of axle 20 a trailer hitch 22 is affixed to frame 12. A trailer 24 attached to the hitch will follow the harvester such that raisins collected by the harvester fall into a receptacle 26 carried by trailer 24.

A further portion of frame 12 includes a right side running board 28 and a left side running board 30 (FIG. 2). The running boards are situated to the front of wheels 18 such that a person may stand upon the running boards while the harvester is in operation. A right side guard rail 29 and a left side guard rail 31 (FIG. 2) are mounted so as to be approximately waist high and to the outside of a person standing upon the respective running boards.

Cross members of frame 12 provide an upper pivot bracket 32 and a lower pivot bracket 34. These brackets provide the means by which the material handling assembly of the apparatus is attached to the frame. More specifically, the conveyor trough 40 is pivotally attached to brackets 32 and 34 by pivot pins 36 and 38, respectively.

Trough 40 provides a pathway for the raisin carrying upper portion of conveyor belt 42. Conveyor belt 42 is an endless loop belt having a segmented belt centering strip 44 disposed on the interior surface of the belt and extending along the belt centerline. Conveyor belt 42 is further provided with regularly spaced load engaging bars 46 which extend laterally across its exterior surface.

Conveyor belt 42 is driven in a counter-clockwise direction as illustrated, over an upper roller 48 and lower roller 50 by a hydraulic conveyor motor 52. Rollers 48 and 50 are cylindrical pulleys having a groove around a circular perimeter in the center of each roller for receiving the centering segments of strip 44. The interaction of the grooves and the belt centering strip 44 prevents side-to-side movement of the belt 42 and aids efficient operation of the apparatus.

The hydraulic conveyor motor 52 is mounted to frame 12 adjacent to upper roller 48 and serves to drive roller 48 in the counter-clockwise direction as viewed in FIG. 1. The frictional engagement between roller 48 and conveyor belt 42 then causes the conveyor belt to move in a corresponding direction. Motor 52 is powered by either the hydraulic system of the tractor or by an independent hydraulic motor attached to the tractor. Fluid for powering motor 52 is delivered via hydraulic hoses 54.

Rigidly attached to the lower end of conveyor trough 40 is front fork 56. The top surfaces of the tines of fork 56 are aligned such that they form a continuously sloping ramp leading up to the front end of conveyor trough 40.

Disposed above fork 56 and extending somewhat above conveyor belt 40 is the draper mechanism 58. Draper mechanism 58 is also rigidly attached to the conveyor trough 40. The conveyor, the front fork and the draper chain mechanism 58 constitute the material handling assembly of the harvester and pivots as a unit upon the pins 36 and 38.

The draper mechanism 58 includes a pair of side rails 62 which are rigidly affixed to conveyor trough 40 at 61, a pair of upper support rails 60 which are pivotally affixed to side rails 62 at 63, a pair of adjusting brackets 64, front sprockets 66 and 68 (FIG. 4), rear guide rollers or sprockets 70 and 72, and a draper web 74. When in use the support rails are adjusted relative to brackets 64 such that draper web 74 is caused to hang down and contact or nearly contact the entire upper surface of fork 56. Draper web 74 travels over sprockets 66, 68, 70 and 72 in a clockwise direction as shown. The movement of the draper web is indirectly powered by conveyor motor 52. More specifically, movement of conveyor belt 42 causes lower roller 50 to rotate in a counter-clockwise direction. A pulley 76 which is rigidly attached to roller 50 drives, by means of crossed belt 78, a pulley 80, which is rigidly attached to sprockets 66 and 68. The sprockets 66 and 68 have teeth which engage chain links on each side of web 74 and thereby cause web 74 to be driven in the clockwise direction.

Also rigidly attached to the material handling assembly of the harvester are skids or runners 81 which slide along the ground and prevent the fork 56 from excessively entering the ground surface.

Attached to the upper rear end of frame 12 is the shaker mechanism 13 which includes a screen bottomed shaker tray 84, support members 86, a hydraulic motor 88, an eccentric actuator 90 and a sand shield 92. Motor 88 receives power from the hydraulic system hoses 54 and drives the eccentric actuator 90 in such a manner that tray 84 is vigorously shaken to separate dirt and other particulate matter from the raisins dropped thereto by the conveyor.

Referring now to FIG. 2, a top view of the improved raisin harvester 10 is shown with certain lower portions of the frame, tow bar and draper chain mechanism broken away to show front fork 56. This view illustrates the manner in which frame 12 is shaped so as to support shaker mechanism 82 and to extend around the front portion of the material handling assembly.

Also illustrated is a hydraulic jack 94 which is pivotally affixed at its lower end to frame 12 and at its upper end to conveyor trough 40. Jack 94 is utilized to adjust the tilt of the material handling assembly of the apparatus relative to frame 12. When jack 94 is extended, the left side of conveyor trough 40 and the elements attached rigidly to the trough will be raised higher than the right side. Conversely, contraction of jack 94 causes the assembly to be tilted to the left.

Further shown in this view are certain details of fork 56. It may be seen that fork 56 is made up of two types of tines; long tines 96 and short tines 98 which are alternatively spaced apart to form open slots between adjacent tines. These slots are provided such that dirt, small pebbles and other materials may pass between the tines of fork 56 without being carried up the upper surfaces thereof to the conveyor.

This figure also illustrates certain details of shaker mechanism 82. For example, it can be seen that in this embodiment shaker tray 84 is situated such that its most forward portion is disposed beneath the upper roller 48 of the conveyor so that raisins or other materials discharged from conveyor belt 42 will fall into shaker tray 84. It can also be seen that the bottom surface of tray 84 is of a mesh material having openings smaller than raisins but larger than most sand and dirt particles. There is an opening at the rear end of tray 84 through which the raisins are discharged from the shaker. The interrelationship of shaker support frames 86, shaker motor 88 and the eccentric actuator 90 is also shown.

Referring now to FIG. 3, a cross section of the raisin harvester taken along line 3—3 of FIGS. 1 and 2 is shown to illustrate the upper support bracket 32 of frame 12 and the manner in which the pivot pin 36 operates to pivotally attach conveyor trough 40 to frame 12. The pivot pins both support the conveyor trough 40 and allow it to be tilted relative to frame 12.

Also illustrated in this figure is the manner in which the conveyor belt 42 returns from the top roller to the lower roller by passing under the cross frame cross member supporting bracket 32. Further shown are the spacing of load bars 46 upon conveyor belt 42.

It can also be seen in this view that sand shield 92 hangs down in front of receptacle 26 so as to prevent foreign matter dropping through the shaker screen from entering the receptacle.

Referring now to FIG. 4 of the drawing there is shown a perspective view illustrating the lower part of the material handling portion of the harvester. This figure illustrates the interrelationship between the conveyor 42, the draper mechanism 74 and the fork 56. Also illustrated are the hydraulic jack 94, and a raisin laden paper tray 102 which is placed on the ground in front of the harvester.

It can be seen from this figure that the long tines 96 of front fork 56 extend beneath and forward of short tines 98. In this manner when the front fork is in operating position, the long tines 96 will contact and slide through the surface ground of the terrace while the short tines 98 will not. This allows rocks and other materials to slide through the space between adjacent long tines and to pass under the short tines. In this manner such unwanted objects are not directed onto the conveyor by the fork.

It can also be seen how the adjusting bracket 64 of the draper mechanism operates to control the amount by which draper web 74 hangs down upon fork 56. Draper web 74 is shown to include a pair of parallel endless side chains 104 and 106 which are connected together by a series of evenly spaced parallel bars 108. Chain 104 travels over the right front sprocket 66 and the right rear sprocket 70 while the left chain 106 travels over left front sprocket 68 and the left rear sprocket 72. As the web 74 is pulled from rear sprockets to the front driving sprockets the bars 108 are supported on guide rails 110 which are rigidly connected to the upper rails 60. Guide rails 110 prevent the web from drooping in the space between the rear sprockets and the front drive sprockets.

As the chains 104 and 106 reach front sprockets 66 and 68, they are forced onto the sprocket teeth by hold down lugs 112 which are suspended from a cross member 113 connecting the upper portions of rails 60 and passing over the top of the web. Hold down lugs 112 cause the chains to properly fit over the sprocket teeth for efficient operation. As the chains leave the front sprockets they are forced off of the sprocket teeth by release lugs 114 which prevent the web chains from following the sprocket teeth around. In this manner, the desired gravitational draping of the web caused by controlled slackness is insured.

The improved raisin harvester operates as follows:

A tractor or other implement is attached to tow bar 14 via hitch 16 so as to pull the harvester. In transit, the tow bar is lifted by the tractor such that the only contact between the harvester and the ground is at the wheels. A trailer 24 is attached to the harvester via trailer hitch 22. The trailer contains large boxes or other receptacles 26 for receiving the harvested raisins.

When the beginning of a row is reached, the hydraulic jack 94 is adjusted such that the tilt of the assembly including the fork, the draper mechanism and the conveyor match the slope of the terrace upon which the raisin laden trays 102 (FIG. 4) have been placed. Tow bar 14 is then lowered by the tractor to a point where runners 81 contact the surface of the terrace and the lower portions of the fork tines 96 slightly enter the surface of the ground. Hydraulic controls on the tractor are then actuated so as to start motors 52 and 88, thus causing operational motion of conveyor belt 42, draper web 74 and shaker mechanism 13. At this point the harvester is ready to pick-up raisins.

As the harvester is pulled forward by the tractor along the row, the long tines 96 of fork 56 slide under a tray 102. At approximately the same time that the upper surfaces of the long tines 96 contact the bottom of tray 102, draper web 74 contacts the top surface of the tray and holds the tray against the upper surfaces of the fork. The forward motion of the harvester relative to the stationary tray and the pulling force of the draper web thereby 74 cause the raisin tray 102 to slide up fork 56 and onto conveyor belt 42. During this sliding motion the short tines 98 prevent tray 102 from being dislodged from the tray. Bars 110 also propel the raisins as well as the tray up the fork to the conveyor belt 42.

After the trays have reached the conveyor belt 42, the motion of conveyor belt 42 carries them up the slope between the sides of conveyor trough 40. At this point workers standing upon running boards 28 and 30 remove the paper trays from the raisins, leaving the loose raisins on conveyor belt 42. The paper trays are then impaled upon the spikes 17 for later disposal. The workers also remove any large unwanted items such as rocks which have been picked up.

The load bars 46 keep the raisins from rolling down the conveyor and cause them to be carried along the trough 40 to be discharged over upper roller 48. At this point the raisins are dislodged by gravity into shaker tray 84. Since the bottom of shaker tray 84 is a mesh screen and since motor 88 and eccentric 90 cause the shaker tray to be vigorously agitated, small particulated matter such as sand is dislodged from the raisins, shaken through the mesh and out of the bottom of the tray whereas the raisins are directed by the slight slope of the screen surface towards the back of the tray, through the opening and down into the receptacle 26. A sand shield 92 depends from tray 84 at a point near the opening and hangs down in front of receptacle 26. Sand shield 92 prevents the sand or particulate matter shaken out in the front portion of the tray from being blown into the receptacle with the raisins.

When the end of a row is reached, the tractor again raises the assembly and pulls the harvester around to pass down the next row in the opposite direction. Since the slope of the next terrace is now opposite to the tilt of the material handling portion of the harvester it is necessary to adjust the tilt by way of the hydraulic jack 94 to again match the slope of the terrace. When this has been done the harvester is ready to repeat the above-described operation.

When receptacles 26 become filled with raisins, either the receptacles may be unloaded from the trailer 24 and replaced, or a new trailer with any empty receptacle may be attached to trailer hitch 22.

Although described herein as operating with the raisins contained on open trays, thus eliminating the step of manually folding or rolling the trays into packets, it may also be seen that the improved raisin harvester of the present invention will function equally well with packets of raisins, should it be necessary to fold the trays in order to prevent excess drying or to protect the raisins from rain.

The preferred embodiment is manufactured from commonly available materials and has no unusual construction requirements.

Although the present invention has been described above in terms of the presently preferred embodiment, it is to be understood that such disclosure is not to be considered as limiting. Accordingly, it is intended that the appended claims be interpreted as covering all alterations and modifications as fall within the true spirit and scope of the invention.

What is claimed is:

1. A raisin harvester for picking-up raisins on unrolled trays, comprising:
   an elongated, wheeled chassis having a front end provided with a trailer hitch for connection to a tractor, and a rear end;
   shaker means affixed to said rear end and including and apertured screen and means for agitating said screen;
   a material handling assembly pivotally attached to said chassis at points along its longitudinal axis, said material handling assembly including
      conveyor means extending along said longitudinal axis and including an elongated trough and an endless conveyor belt for moving articles disposed thereon from a receiving end to a discharge end, said discharge end being disposed above said shaker means;
      fork means disposed forward of an affixed to the receiving end of said trough, said fork means being carried with its front end at substantially ground level so as to pass under a paper tray supporting raisins to be harvested, said fork means including a first plurality of elongated tines of a first length disposed in parallel spaced-apart relationship to each other, and a second plurality of elongated tines of a second length shorter than said first length respectively disposed between said first tines;
      draper means including a first sprocket means affixed to said trough and disposed above and forward of the forward end of said fork means, a second sprocket means disposed above the receiving end of said conveyor means and draper web means driveably supported by first and second sprocket means such that said web means passes over the tops of said first and second sprocket means and drapes downwardly therefrom so as to contact a substantial portion of the length of said fork means; and
      drive means for driving said conveyor means and said draper means such that an open tray containing raisins and engaged by said fork means is also engaged by said web means and drawn along said fork means to the receiving end of said conveyor means, said conveyor means thereafter conveying the tray and raisins past a worker station where the tray is separated from the raisins and thereafter conveying the raisins onto the screen of said shaker means where sand and other particulate matter is separated therefrom.

2. A raisin harvester as recited in claim 1 wherein said conveyor means further includes drive pulley means disposed at the discharge end of said conveyor means for driveably engaging said conveyor belt, and idler pulley means disposed at said receiving end of said conveyor means and driven by said conveyor belt, and wherein said drive means includes a hydraulic motor for driving said drive pulley means and means driveably coupling said idler pulley means to said first sprocket means.

3. A raisin harvester as recited in claim 1 or 2 wherein said material handling assembly further includes jack means for selectively tilting said assembly relative to said chassis and about its pivotal attachments.

4. A raisin harvester as recited in claim 3 wherein said draper means further includes support rails pivotally affixed to said trough for adjustably supporting said first and second sprocket means, and
wherein said draper web means includes a pair of endless side chains for engaging said first and second sprocket means and a plurality of elongated bars disposed in spaced apart parallel relationship to each other each end connected to one of said side chains.

5. A raisin harvester as recited in claim 1 or 2 wherein said draper means further includes support rails pivotally affixed to said trough for adjustably supporting said first and second sprocket means.

6. A raisin harvester as recited in claim 5 wherein said draper web means includes a pair of endless side chains for engaging said first and second sprocket means and a plurality of elongated bars disposed in spaced apart parallel relationship to each other each end connected to one of said side chains.

7. A raisin harvester as recited in claim 1 or 2 wherein said material handling assembly further includes jack means for selectively tilting said assembly relative to said chassis and about its pivotal attachments.

8. A raisin harvester as recited in claim 4 wherein said material handling assembly further includes jack means for selectively tilting said assembly relative to said chassis and about its pivotal attachments.

9. A raisin harvester as recited in claim 8 wherein said fork means includes a first plurality of elongated tines of a first length disposed in parallel spaced-apart relationship to each other, and a second plurality of elongated tines of a second length shorter than said first length respectively disposed between said first tines.

10. A raisin harvester for picking-up raisins on unrolled trays, comprising:
an elongated, wheeled chassis having a front end provided with a trailer hitch for connection to a tractor, and a rear end;
shaker means affixed to said rear end and including an apertured screen and means for agitating said screen;
a material handling assembly pivotally attached to said chassis at points along its longitudinal axis, said material handling assembly including
conveyor means extending along said longitudinal axis and including an elongated trough and an endless conveyor belt for moving articles disposed thereon from a receiving end to a discharg end, said discharge end being disposed above said shaker means;
fork means disposed forward of and affixed to the receiving end of said trough, said fork means being carried with its front end at substantially ground level so as to pass under a paper tray supporting raisins to be harvested, said fork means including a first plurality of elongated tines of a first length disposed in parallel spaced-apart relationship to each other, and a second plurality of elongated tines of a second length shorter than said first length respectively disposed between said first tines;
skid means affixed to a front portion of said material handling assembly for controlling the relationship of said fork means to the ground over which said harvester is drawn;
draper means including a first sprocket means affixed to said trough and disposed above and forward of the forward end of said fork means, a second sprocket means disposed above the receiving end of said conveyor means and draper web means driveably supported by first and second sprocket means such that said web means passes over the tops of said first and second sprocket means and drapes downwardly therefrom so as to contact a substantial portion of the length of said fork means; and
drive means for driving said conveyor means and said draper means such that an open tray containing raisins and engaged by said fork means is also engaged by said web means and drawn along said fork means to the receiving end of said conveyor means, said conveyor means thereafter conveying the tray and raisins past a worker station where the tray is separated from the raisins and thereafter conveying the raisins onto the screen of said shaker means where sand and other particulate matter is separated therefrom.

11. A raisin harvester as recited in claim 10 wherein said conveyor means further includes drive pulley means disposed at the discharge end of said conveyor means for driveably engaging said conveyor belt, and idler pulley means disposed at said receiving end of said conveyor means and driven by said conveyor belt, and wherein said drive means includes a hydraulic motor for driving said drive pulley means and means driveably coupling said idler pulley means to said first sprocket means.

12. A raisin harvester as recited in claim 10 wherein said draper web means includes a pair of endless side chains for engaging said first and second sprocket means and a plurality of elongated bars disposed in spaced-apart parallel relationship to each other, each end connected to one of said side chains.

* * * * *